June 5, 1934.     E. S. LARSON     1,961,368
FORCE MEASURING DEVICE
Filed Dec. 3, 1932

INVENTOR
EDWARD STANLEY LARSON
BY
ATTORNEY

Patented June 5, 1934

1,961,368

UNITED STATES PATENT OFFICE 1,961,368

FORCE MEASURING DEVICE

Edward Stanley Larson, Chicago, Ill., assignor to Teletype Corporation, Chicago, Ill., a corporation of Delaware Application December 3, 1932, Serial No. 645,537

3 Claims. (Cl. 265—18)

The present invention relates to force measuring devices and more particularly to instruments of this class in which a spring element is used as a standard from which to determine pull and push force components accurately.

A salient object of the present invention is to provide a coil spring force measuring device that may be manufactured under quantity production methods and that may be quickly adjusted to allow for manufacturing inaccuracies.

This invention contemplates a force measuring device in which a helical spring element is used having a plunger disposed concentrically thereof. One end of the plunger is blunt so as to be suitable to abut objects to be tested or measured for push forces, and its other end is hooked for engaging objects to be measured for pull forces. The spring and plunger are contained within a closely defining housing provided with longitudinal slots or sights, and the readings are determined by the relative movement between the plunger and the housing as evidenced by a fixed point or finder secured to the plunger and visible through the aforementioned sights. According to one embodiment the force measuring device is provided with means for adjusting the indicator so that characteristic variations of resiliency in the spring elements and such differences as develop as a result of erosion and repeated strain may be readily adjusted.

The method of adjustment featured in the present invention is characterized by the fact that means for adjustment is provided which does not merely add to or diminish from the normal elasticity nor does it disturb the zero position of the spring element but, as indicated more particularly hereinafter, the object is accomplished by simply varying the active length of the spring element.

A better understanding of the present invention may be had in the course of the following detailed description when taken in conjunction with the accompanying drawing in which.

Figure 4:
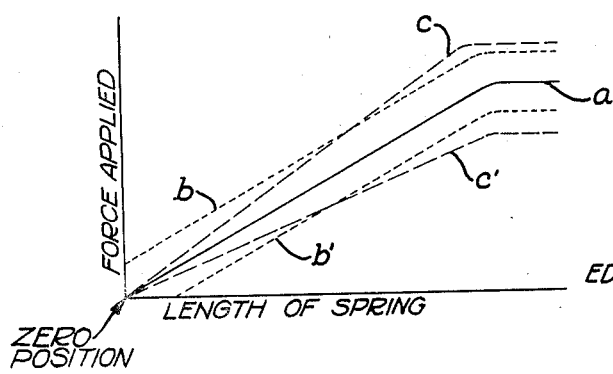

Fig. 4 indicates a chart upon which are plotted various curves denoting the effect of regulating elasticity by means of the present invention as contrasted with the method heretofore used or known.

As will be clear from the accompanying illustrations a plunger 11 is provided at one end with a blunt portion 12 and at its other end with a hook or extending portion 13. Near one end plunger 11 has secured to it the reduced or inner coils of a helically wound spring 14 having involute termination 15 thereat. The opposite end of spring 14 terminates with parallelly wound coils and is disposed adjacent one end 17 of an enclosure of a housing 16. The end 17 of housing 16 is internally threaded at 18 and is adapted to receive thereinto a bushing 19 shouldered at 21 for supporting the spring and again at 22 for abutment against the end 17 of housing 16. Within bushing 19 is supported another bushing 23 by threaded engagement therebetween and the latter bushing 23 terminates at one end with a cross head portion 24 having prong terminals 25 that are adapted to be snugly received within contiguous convolutions of spring 14. The threads of bushing 23 have the same pitch as has the spring element 14 so that upon rotating the bushing in either direction it progresses a similar distance with respect to bushing 19 or housing 16 as with respect to the turns of spring 14. In this manner if the bushing 23 is moved longitudinally with respect to the housing by rotating it in one direction or another the cross head 24 thereof intercepts a variable length of the spring 14 between itself and the point 15 at which it is secured to the plunger 11, without affecting the normal or zero position of the plunger. In so varying the subtended portion of spring 14 its resiliency may be varied in accordance with the formula $$R = \frac{Kd^4}{D^3N},$$

where
  $R =$ the variations in force per unit of deflection
  $K =$ a constant representing the modulus of torsional elasticity
  $d =$ diameter of wire
  $D =$ mean diameter of coil
  $N =$ number of effective turns on the coil By adjusting in this manner for resiliency attention is directed to the fact that the plunger 11 is not disturbed relative to the housing 16 as is necessarily the case where adjustment for elasticity is made by introducing a compensating force to a constant length of spring. The difference between these two modes of adjustment is more clearly brought out in Fig. 4 of the accompanying drawing in which curve *a* represents a given component of elasticity and curves *b* and *b'* indicate adjustments made by the introduction of compensating forces in which case it is noted that the zero position is proportionately varied while curves *c* and *c'* indicate adjustments made by varying the length of the subtended or active portion of the spring element 14 in which case the zero position remains constant.

For convenience in reading the movement between plunger 11 and barrel 16 a disk 26 is secured to the plunger having converging sides which afford a knife edge circumference parallelly set off against graduations 27 engraved upon a plate 28 which is longitudinally adjustable upon barrel 16 adjacent a slot 29 coextensive with the distance in which disk 26 is movable.

In order to make this scale adaptable for use in a vertical position both as a pull and a push measuring device the engravings 27 on one side of slot 29 may be made to correspond with its use as a pull measuring device while the engravings on the opposite side of slot 29 may be made to correspond to the indications as it is used for measuring push forces. That is to say, if it is held in a vertical position with end 12 upwardly the weight of plunger 11, as well as that of its associated moving parts, are added to any pull forces that are to be measured. While on the other hand if held with end 13 upwardly so as to measure push forces, the weight of the aforesaid parts diminish from such forces whereas, by having a separate set of graduations one corresponding to each direction in which the device may be used, the allowance for the weight of the operating parts may be conveniently taken care of in the design of the graduations without having overtly to make such special allowances.

Figure 1:
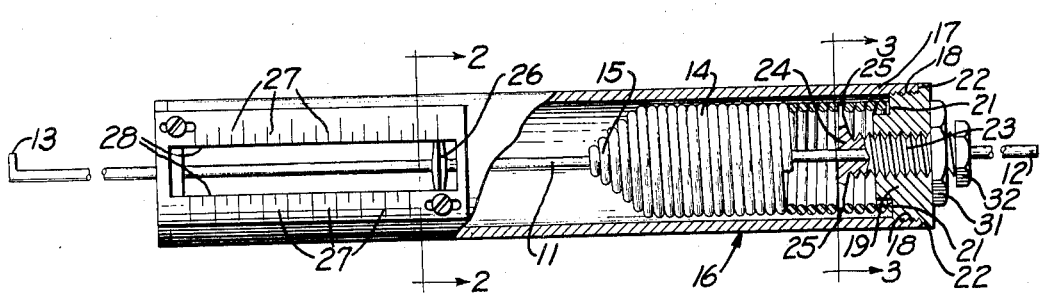
Fig. 1 is a plan view with parts broken away illustrating a measuring device embodying the features of the present invention.
Figure 2:
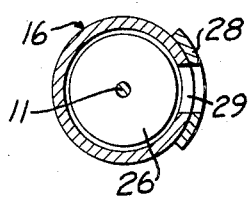
Fig. 2 is a cross sectional view taken approximately on line 2—2 of Fig. 1.
Figure 3:
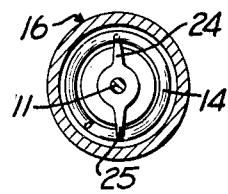
Fig. 3 is a cross sectional view taken approximately on line 3—3 of Fig. 1.

Referring again to the bushing 23 it will be noted from Fig. 1 that after the proper adjustment has been made and a suitable number of turns of spring 14 are intercepted by cross head 24, bushing 23 may be securely locked by double lock nuts 31 and 32, so that the adjustment once established may be securely maintained even under severe and strenuous handling to which the device might be subjected.

Operation

Suppose that it is desired to determine the resistance of an object, for example, a friction clutch in order to find how much force is necessary to overcome its frictional engagement. Either end 12 or 13 may be placed against the movable portion of the clutch while its associated portion is held secure and observation is made by noting the advance of the indicator 26 upon scale 27 (either up or down depending upon the position in which the instrument is held) until such time that the object, which is the clutch in this case, submits to the force applied. The unknown force may thus be accurately determined.

It will be understood of course that where material is used in the spring element of a superior quality the discrepancy in its operation due to erosion or deterioration may be very slight. However, even in the case where superior spring elements are used it is commonly known that considerable variation necessarily occurs during mass production of spring elements notwithstanding that a high degree of care is used in their several steps of manufacture which include among other things drawing, tempering, and winding. Accordingly the utility of the present invention is universally applicable to the manufacture of spring measuring devices, while it may be only occasionally applicable to the regulation and readjustment of such devices to compensate for losses due to the effects of wear and strain.

The present invention as hereinbefore explained has been applied to a particular structure as indicated in the accompanying drawing. It will be understood that numerous modifications and variations of this invention may be made without departing from the scope or spirit thereof. It is therefore intended not to be limited to any of the foregoing particular description but rather to have the invention defined in accordance with the hereinafter appended claims.

What is claimed is:

1. In a force measuring device a cylindrical housing having a longitudinal opening in the side thereof, a plunger passing through said housing concentrically and longitudinally thereof, an indicator disc secured to said plunger and visible through said longitudinal opening in said housing, a spring element of predetermined elasticity having one end secured to said plunger, a bushing having screw engagement with said housing, a central longitudinal opening therein through which said rod is free to move, and means formed with said bushing and adapted upon variable movement thereof to intercept a corresponding portion of said spring element for varying the active portion thereof.

2. In a force measuring device, a tubular housing, a measuring rod passing concentrically and longitudinally through said housing, means for indicating the relative movement between said rod and said housing, a spring element having one end secured to said rod, means for apportioning a variable amount of said element for active condition between said rod and said housing including a sleeve having screw engagement with said housing of a pitch equivalent to that of said spring element and an opening concentrically thereof through which said rod is free to pass, and a pair of lugs which constitute the immediate intercepting agency for apportioning a variable amount of said spring for active condition.

3. In a spring measuring device, a plunger having an abutment portion at one end thereof and a hook engagement portion at the other end thereof, a housing forming an enclosure for all but the end portions of said plunger, a spring of predetermined elasticity constituting the measuring element for determining the amount of force necessary to move said plunger with respect to said housing, an indicator secured to said plunger, and a scale affording a duplicate set of graduations to said indicator for indicating force measurements in a direction when the weight of said spring and plunger contribute to the force to be measured as well as when said weight diminishes therefrom.

EDWARD STANLEY LARSON.